United States Patent
Hrle et al.

(10) Patent No.: US 7,337,195 B2
(45) Date of Patent: *Feb. 26, 2008

(54) METHOD AND DEVICE FOR ESTABLISHING SYNCHRONIZED RECOVERY LOG POINTS

(75) Inventors: Namik Hrle, Boeblingen (DE); Inderpal Singh Narang, Saratoga, CA (US); James Zu-Chia Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 483 days.

This patent is subject to a terminal disclaimer.

(21) Appl. No.: 10/334,892

(22) Filed: Dec. 31, 2002

(65) Prior Publication Data

US 2004/0215666 A1    Oct. 28, 2004

(51) Int. Cl.
*G06F 17/30*    (2006.01)
*G06F 17/00*    (2006.01)

(52) U.S. Cl. .................. 707/202; 707/201; 709/227

(58) Field of Classification Search .............. None
See application file for complete search history.

(56) References Cited

U.S. PATENT DOCUMENTS

| | | | |
|---|---|---|---|
| 5,832,515 A * | 11/1998 | Ledain et al. | 707/202 |
| 6,684,336 B1* | 1/2004 | Banks et al. | 709/227 |
| 2001/0044898 A1* | 11/2001 | Benussi et al. | 713/173 |
| 2003/0208511 A1* | 11/2003 | Earl et al. | 707/204 |
| 2005/0055605 A1* | 3/2005 | Blumenthal et al. | 714/13 |
| 2005/0071384 A1* | 3/2005 | Cotner et al. | 707/200 |
| 2005/0091557 A1* | 4/2005 | Mitchell et al. | 714/2 |

* cited by examiner

*Primary Examiner*—Tony Mahmoudi
(74) *Attorney, Agent, or Firm*—Richard M. Goldman (57) ABSTRACT

According to the present invention a method and a system is provided for establishing synchronized recovery log points in an infrastructure comprising at least a first database management system and a second database management system, whereby recovery log files are written and log points are created separately for each database management system. Firstly, log write of all database management systems is suspended, then, the corresponding log points for each database management system forming a global log point are recorded and log writes of all database management systems are resumed.

9 Claims, 6 Drawing Sheets

| | 512 | 513 | 514 | 515 | 516 |
|---|---|---|---|---|---|
| 520 → | Global Log Point ID | DB 1 | DB 2 | ... | DB n |
| 521 → | Global Log Point 1 | Log 1 ID203 | Log 2 ID199 | ... | Log n ID1208 |
| 523 → | Global Log Point 2 | Log 1 ID453 | Log 2 ID201 | ... | Log n ID1281 |
| 524 → | ... | ... | ... | ... | ... |
| 525 → | Global Log Point m | Log 1 IDxxx | Log 2 IDyyy | ... | Log n IDzzzz |

METHOD AND DEVICE FOR ESTABLISHING SYNCHRONIZED RECOVERY LOG POINTS

BACKGROUND OF THE INVENTION

1. Field of the Invention

The present invention relates to a method and device for database management. Particularly, the present invention relates to a method and device for establishing synchronized recovery log points in a plurality of databases in multiple separate database management systems.

2. Description of the Related Art

From U.S. Pat. No. 5,778,388 by Nobuo Kawamura et. al, assigned to Hitachi, Ltd., filed Sep. 15, 1995, issued Jul. 7, 1998, "Method of Processing a Synchronization Point in a Database Management System to Assure a Database Version Using Update Logs From Accumulated Transactions" a database management system is known for performing a plurality of transactions concurrently, in which a restart recovery process is assumed at an occurrence of a system failure, a method for acquiring a synchronization point (syncpoint) for assuring a database version on an external storage, said syncpoint being determined at each interval at which database update logs from the transactions are accumulated (incremented) to a given amount. The suggested method starts with assigning, at the beginning of acquisition of a syncpoint, a mark indicating that syncpoint acquisition is in progress, the tables controlling all updated pages in a buffer pool mapped onto a main storage, said buffer pool including a plurality of buffers for storing respective pages, said updated pages not having been written into a database of an external storage. Then, during the syncpoint acquisition, the updated pages for the marked table are written to the database of the external storage. Subsequently, a transaction is executed for further updating specific ones of the updated pages for the marked tables during the syncpoint acquisition process, before the updated page or pages are accessed, writing the further updated specific page or pages to said database, removing the mark from the control table for the further updated specific pages to allow a request of access to the further updated specific pages, and, finally, in response to termination of the write operation to said database, it is determined that the syncpoint acquisition is completed at the end of the write operation for all updated pages for the marked tables.

Kawamura describes a method for establishing a syncpoint for multiple transactions within a single database. However, customer business applications system landscapes often consist of multiple components running on different hardware and software. As these components exchange data and interact with each other the entire system needs to be considered as a single unit of semantical integrity.

In other words, the data must be consistent not only within each individual application component (intra-component consistency), but across the system as well (inter-component consistency). Typical example of such a system landscape is e-business applications such as CRM (Customers Relations Management) and SCM (Supply Chain Management), which are building on top of the existing ERP (Enterprise Resource Planning) or legacy applications and tightly integrated with them.

In order to ensure inter- and intra-components consistency, the applications most often rely on two well-known technologies. The intra-component consistency is achieved by deploying a DBMS (Data Base Management System), which includes necessary mechanisms such as maintaining recovery log and concurrency control. The inter-component consistency is typically maintained by implementing the DBMS two-phase commit feature or by using programming techniques that implement a so-called 'store and forward' protocol.

In the case of system or component failure that requires a recovery to currency (such as media failure), a coordinated recovery of each affected component will bring the entire system to a consistent state. However, this procedure cannot be used if the system needs to be recovered to any point in time in the past. Namely, there is not a common database log for all the participating components and synchronization points must be established by some administrative operation. One way of doing it, is to stop (quiesce) update processing for all the components, register that time or associated recovery log point and use it as a target in subsequent recovery.

The recovery target point established in this way is indeed a point at which the intra- and inter-component consistency is guaranteed, but the process of obtaining these points is prohibitively disruptive for normal functioning of the system, complex and error prone in terms of human interaction, and poses a major hurdle in achieving a high level of continuous operations which is an important requirement of the business critical applications.

OBJECT OF THE INVENTION

Starting from this, the object of the present invention is to provide a method and a device for establishing prior point in time recovery targets with minimal impact on continuous systems operations.

BRIEF SUMMARY OF THE INVENTION

The foregoing object is achieved by a method and a system as laid out in the independent claims. Further advantageous embodiments of the present invention are described in the sub claims and are taught in the following description.

According to the present invention a method and an system is provided for establishing synchronized recovery log points in an infrastructure comprising at least a first database management system and a second database management system, whereby recovery log files are written and log points are created separately for each database management system. Firstly, log write of all database management systems is suspended, then, the corresponding log points for each database management system forming a global log point are recorded and log writes of all database management systems are resumed.

In other words, the present invention proposes a method for establishing synchronized recovery log points with minimal disruption to the normal system operations. For example, two log points, logx and logy, from two different databases X and Y are synchronized, if recovering components X and Y to the times that correspond to logx and logy, respectively. This preserves the intra- and inter-component consistency.

The logs can be synchronized if log write operations are suspended for all the participating databases. Due to a so-called log-write-ahead technique, which is used by most available databases, the point at which the log writes are suspended specifies the time at which the component can be recovered to a consistent state. Consequently, if there is a time when the log writes are suspended for all the components the associated log points are synchronized, i.e. the components can be recovered and preserve inter-components consistency. Here is an example. Let's say there are two components X, Y with its associated databases. The following sequence of events will establish a pair of logs points at which the entire system can be recovered to the consistent state:

Suspend log write for X. Record the corresponding log point (logx).

Suspend log write for Y. Record the corresponding log point (logy).

Resume log write for X.

Resume log write for Y

Steps 1. and 2. can be done in parallel. So can steps 3 and 4. The important condition is that no log write gets resumed before the last component's log write gets suspended. The procedure is independent of the number of participating components.

The operations of suspending and resuming log writes can be done by the databases or disk subsystem means. Many databases already have the feature to suspend their own log writes and record the corresponding log point. Alternatively, the operations can be done by the disk subsystem. In any case the duration of the entire procedure is in the sub-second range and has very small impact on the normal systems operations. It can be done on demand (e.g. before some sensitive system changes that could go wrong) and repeated in regular intervals. It is applicable to any database system implementation: SMP, MPP (such as DB2 EEE) and shared disk (such as DB2 Data Sharing or Oracle RAC).

From the implementation point of view we envisage an automated procedure controlled by a backup/recovery coordinating server that would initiate the log write suspends across the entire systems landscape according to the user-specified policy. The policy would contain specifications such as the synchronization frequency, acceptable wait time for the synchronization to complete (in the case of some components not being functional), frequency of full backups, etc. The coordinating server would also maintain an inventory of log synchronization points that is readily available for the case the system recovery is needed. These elements are crucial building blocks for recovering complex systems in an autonomic way.

BRIEF DESCRIPTION OF THE SEVERAL VIEWS OF THE DRAWINGS

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE INVENTION

Figure 1:
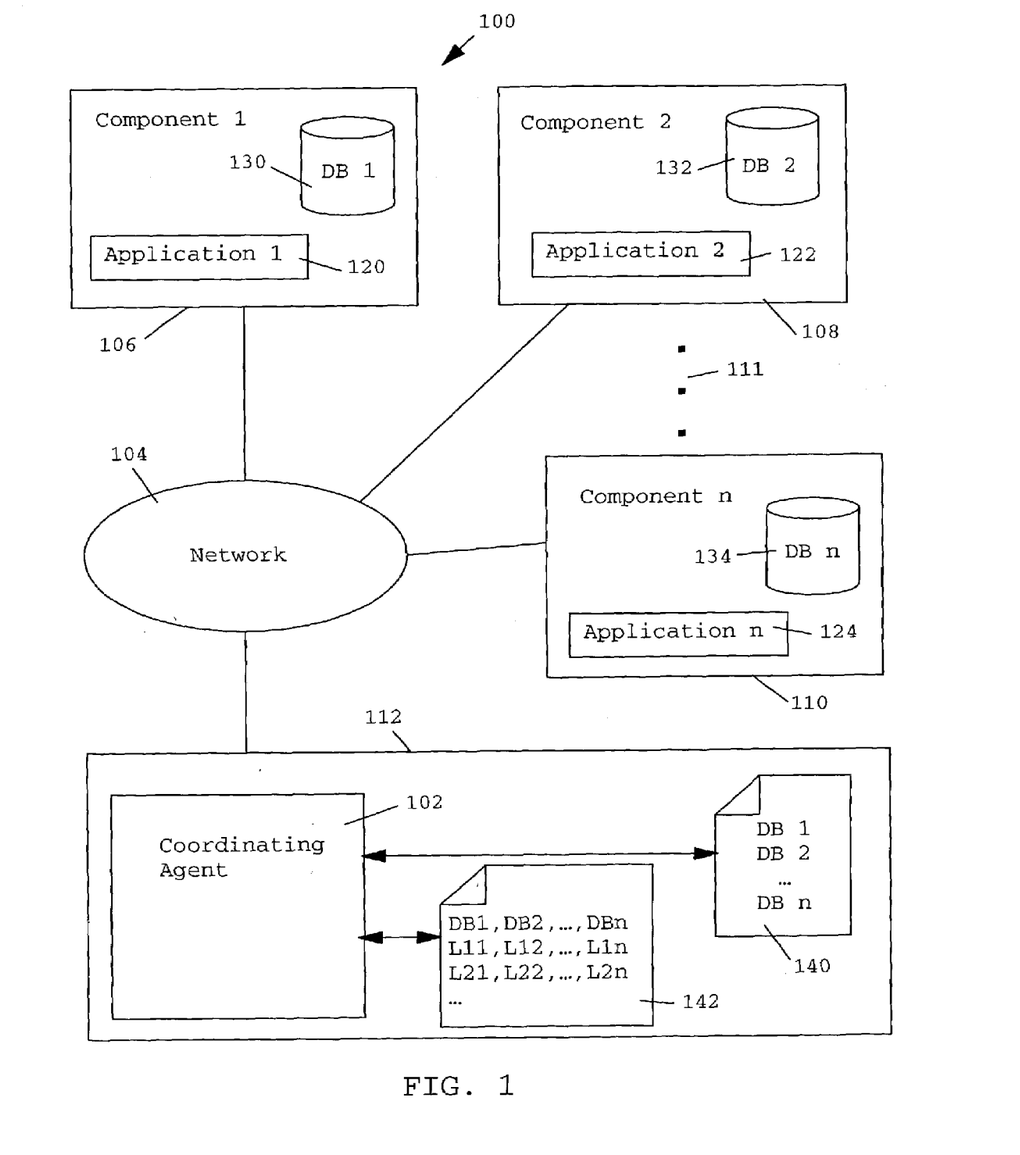
FIG. 1 shows a block diagram illustrating a customer business applications system landscape in which a method and a device for establishing synchronized recovery log points according to the present invention may be used.

With reference to FIG. 1, there is depicted a block diagram illustrating a customer business applications system landscape 100 in which a method and a device for establishing synchronized recovery log points according to the present invention may be used. The landscape 100 includes a network 104 and a plurality of components, illustrated as a first component 106, a second component 108 and an n-th component 110, whereby the dots 111 indicate that the number n of components forming the landscape is not limited to three. It may, in fact, be much higher. The number of components involved in such a complex system is not limited. Today, it is typically 3-5, sometimes up to 10. Furthermore, a computer system 112 providing a platform for the Coordinating Agent 102 is connected to the network 104.

The components are typically be formed by separate computer systems. However, it may also be possible that at least two components are running on the same computer system. Each component provides a particular functionality formed by a corresponding application. A first application 120 is associated to the first component 106, a second application 122 is associated to the second component 108 and an n-th application 124 is associated to the n-th component 110. It is acknowledged that a component may also include more than one application.

Furthermore, each component includes a database 130, 132, 134. The expression database should be understood as a complete implementation of a non-volatile storage system, comprising, in particular, a database management system (DBMS) and a respective storage device, such as a hard disk. It may also be possible, that one application accesses more than one database or that one component may include more than one database. However, since one object of the present invention is to establish prior point in time recovery targets, it has to be ensured that the method and the device according to the present invention consider every single database during the process of establish prior point in time recovery targets.

When discussing the method and device according to the present invention in the following, it is stated that messages are sent to the databases. Depending on the actual setup, this might be performed by a communication via the network and the application, or directly via the network to the database management system of the respective database, or via some interface provided by the respective component. In short, the Coordinating Agent 102 is configured to be able to communicate with every one of the databases 130, 132 and 134.

A general-purpose computer hosting the Coordinating Agent 102 may form the Computer system 112. It should be noted that the Coordinating Agent 102 could also run in one of the components 106, 108, 110. A first set of information 140 about the databases to be considered and a second set of information 142 about the prior point in time recovery targets, also called "Global Log Points", are associated to the Coordinating Agent 102. The first and second set of information 140, 142 may be stored in a file, e.g., structured in XML (Extensible Markup Language), or in a database table.

The network could be formed by any communication link (wired or wireless) facilitating the communication between the Coordinating Agent 102 and the databases 130, 132, 134. Typically, the network may be formed by TCP/IP (Transmission Control Protocol/Internet Protocol) network, such as the Internet. However, it could also be formed by an Intranet, a Virtual Private Network (VPN)

Figure 2A:
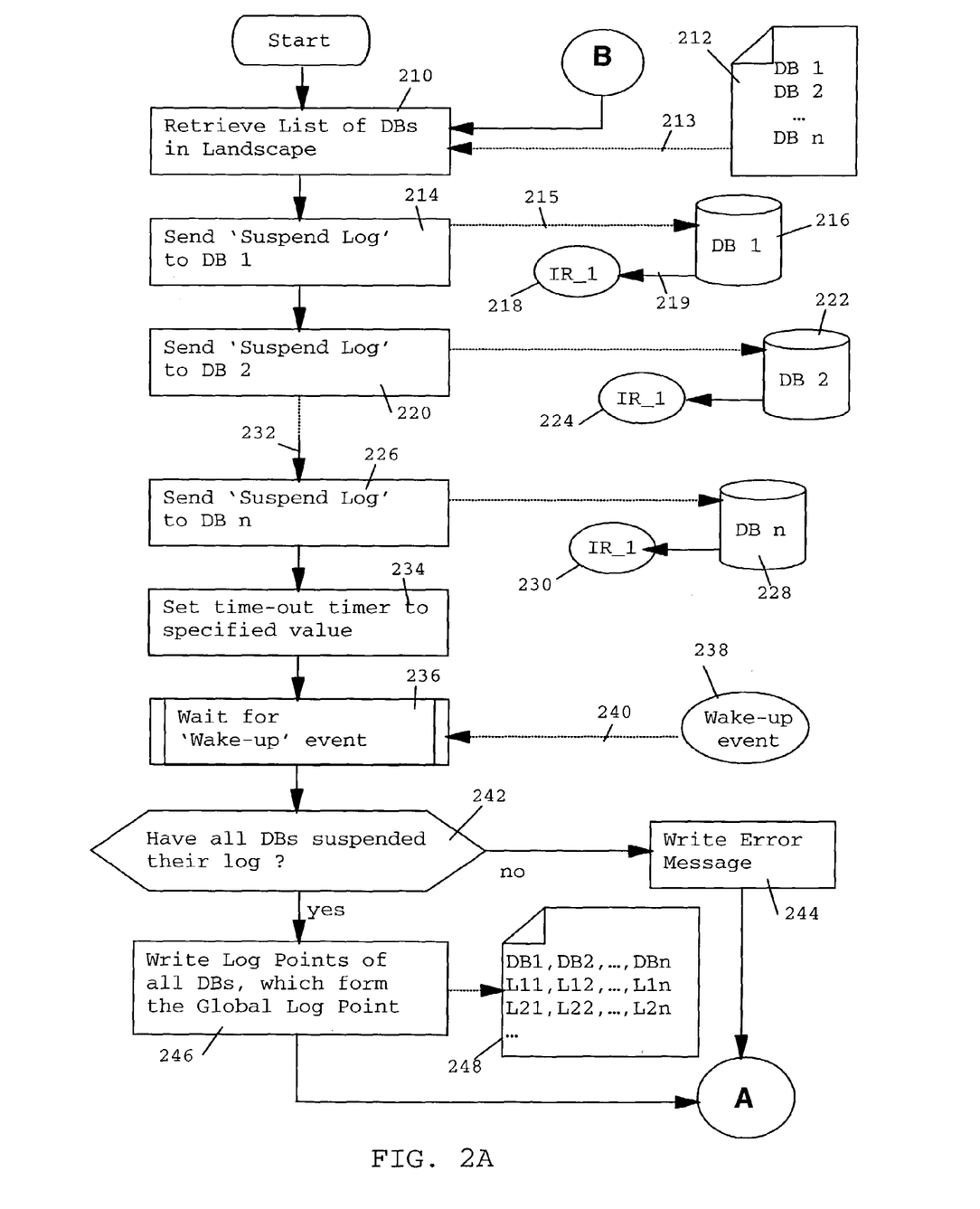
FIG. 2a, 2b show a detailed flow chart of a first module implementing the method for establishing synchronized recovery log points according to the present invention.
Figure 2B:
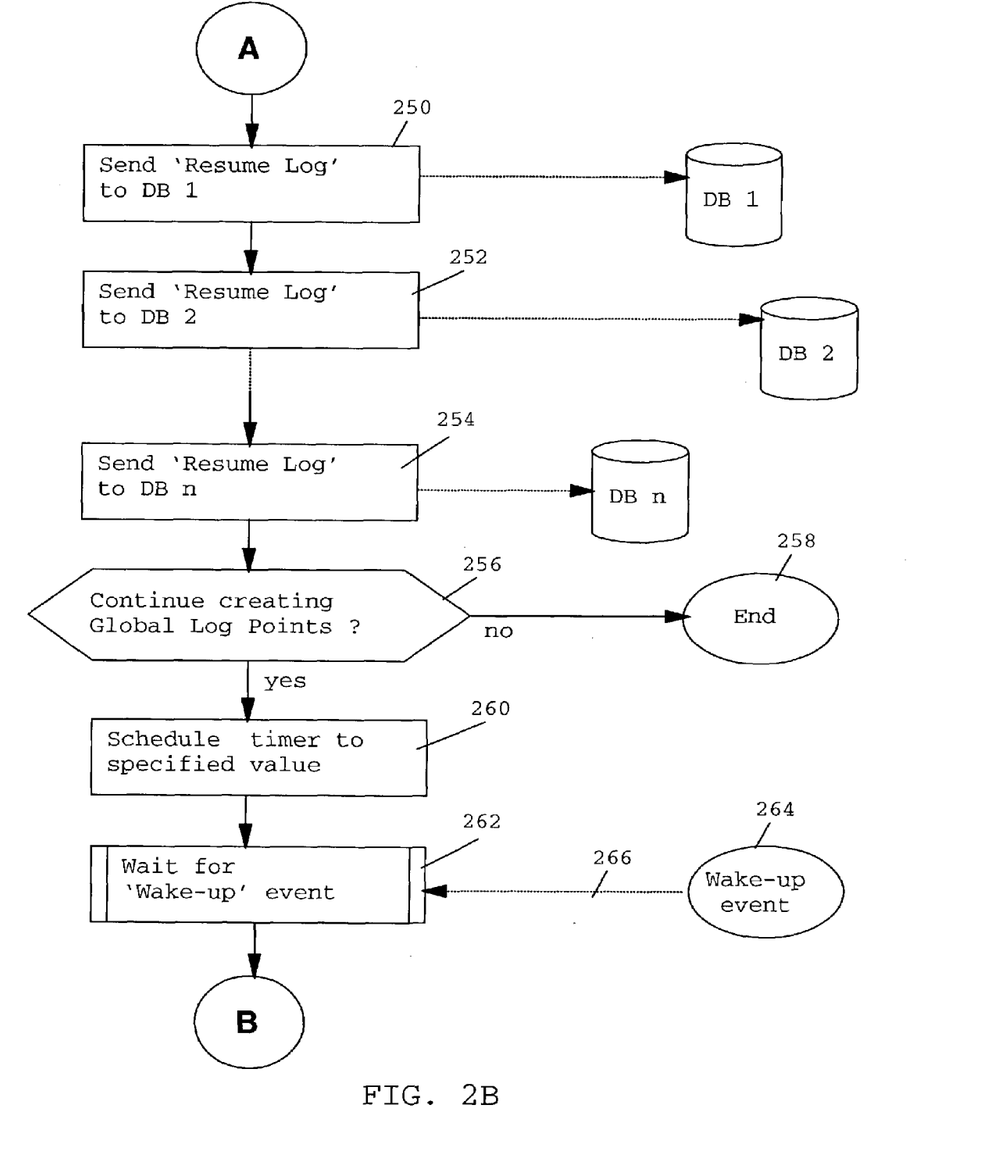

With reference to FIGS. 2a and 2b, there is depicted a detailed flow chart of a first module implementing the method for establishing synchronized recovery log points according to the present invention. First of all, the Coordinating Agent (102 in FIG. 1) retrieves a list of all databases in the landscape for which a Global Log Point needs to be established (block 210). The list of all databases may be stored in a file (box 212) and may be read by the Coordinating Agent as illustrated by the dotted lined arrow 213 running from box 212 to block 210.

Subsequently, a command instructing the database to suspend writing its log file is sent to each database. The log file of a database contains the information that is needed to recreate a consistent state of said database at a prior point in time. All modern databases, such as, DB2, Sybase, Oracle, provide such log files and the functionality of suspending of writing the log file. Block 214 illustrates this step. It should be noted that it is assumed that sending the suspend log command is done asynchronously as illustrated by the dashed lined arrow 215, i.e., after sending the command, the Coordinating Agent may continue the processing without being forced to wait for a response, e.g., an acknowledge, from the respective database 216. Instead of waiting for a response, an interrupt handler gets activated that takes care of incoming responses from the databases. Circle 218 and the respective arrow 219 illustrate the database calling the interrupt handler. The interrupt handler will be explained below with reference to FIG. 3.

Correspondingly, block 220 illustrates sending the suspend log command to the second database 222, which in return may call the interrupt handler (circle 224) and block 226 illustrates sending the suspend log command to the n-th database 228, which in return may call the interrupt handler (circle 230). The partly dotted lined arrow 232 between block 220 and block 226 illustrates that the suspend log command may be sent to a plurality of databases. It is acknowledged that the steps of sending the suspend log command to the databases may also be implemented synchronously or by using any kind of loops iterating through the list of all databases in the landscape.

Then, a time-out timer is set to a specified period of time (block 234). The time-out timer is typically be provided by the system that is hosing the Coordinating Agent, such as an operating system, e.g., GNU/Linux, UNIX. After the specified period of time has passed, the time-out timer generates a wake-up event that is sent to the Coordinating Agent to initiate further processing. This mechanism ensures that the operation of the databases are only delayed by a certain amount of time, which is normally set by the operator considering the real time constrains of the overall system forming the landscape. It should be noted that the step of setting the time-out timer may also be performed earlier in the procedure, e.g., before sending the first suspend log command to the database, without departing from the idea of the present invention.

Subsequently, the execution of the procedure is halted (block 236). In this state the procedure waits for a wake-up event (block 238), which may either be initiated by the time-out timer or by the interrupt handler called by one of the databases. Since, the occurrence of the wake-up event is not synchronous it is visualized by a dashed lined arrow 240.

At the latest when the time-out timer activates a wake-up event, the processing is continued. It may be earlier, namely, when all databases acknowledged that they suspended their log (cf. below with reference to FIG. 3). At this point, it gets determined whether or not all the databases suspended their log (block 242). If no, an error message is written informing the administrator that a global log point could not be established (block 244). This might be the case if the communication to one database is delayed or temporarily interrupted. It is acknowledged that writing the error message may also be performed later in the procedure. If yes, the log points returned by the databases, i.e., the entry in the respective log file indicating the fall back position of the particular database, are stored (block 246) in a file or table 248. Together with an indicator they form the global log point.

Then, a resume log command is sent to all databases as illustrated by blocks 250, 252 and 254. It should be noted that the resume log commands might also be sent in parallel to all the participating components (similar to the suspend log commands as described above). The only thing that matters is that at some point in time all the logs are suspended. The chronological sequence is not important.

Thereafter, it is determined whether or not it should be continued to create global log points (block 256). If no, the procedure ends here (block 258). If yes, a timer, such as a time-out timer, is programmed to schedule a wake-up event, which initiates establishing another global log point (block 260). Depending on the actual needs, global log points get established regularly, e.g., every hour or twice a day.

Subsequently, the execution of the procedure is halted (block 262). In this state the procedure waits for a wake-up event (block 264), initiated by the time-out timer. Since, the occurrence of the wake-up event is not synchronous it is visualized by a dashed lined arrow 266. After the wake-up the procedure is continued at the beginning (block 210).

Figure 3:
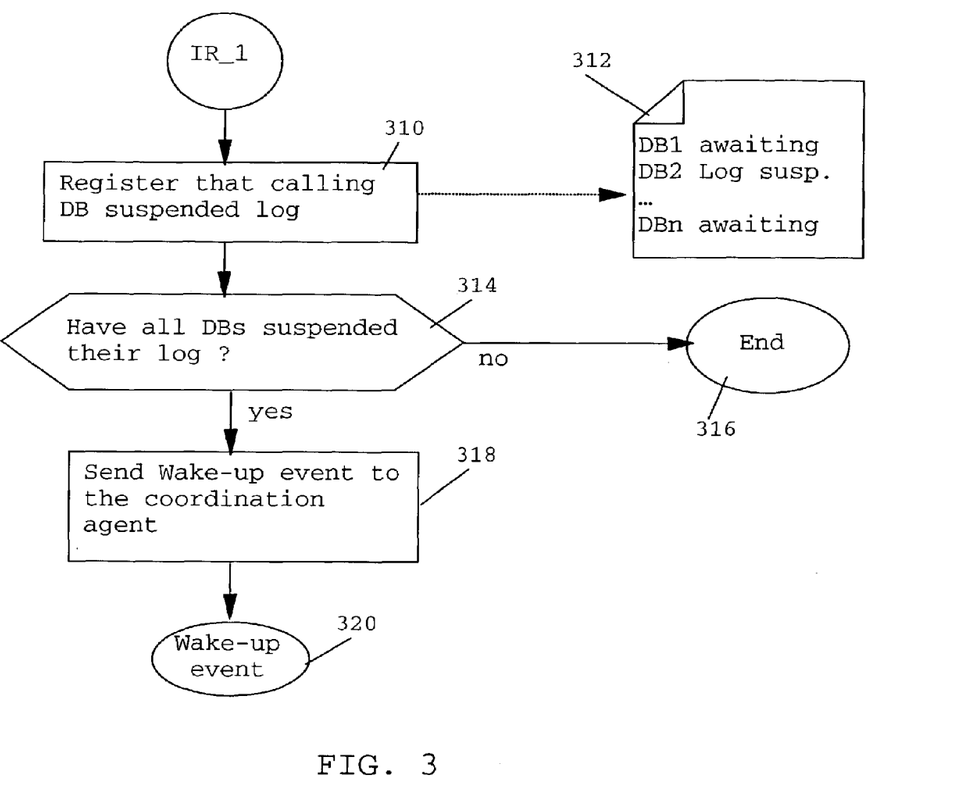
FIG. 3 shows a detailed flow chart of a second module implementing the method for establishing synchronized recovery log points according to the present invention.

With reference to FIG. 3, there is depicted a detailed flow chart of a second module implementing the method for establishing synchronized recovery log points according to the present invention.

The interrupt handler execution starts with the step of registering the fact that the calling database suspended the log (block 310). Writing such information into a list 312, e.g. formed by a file, which is later accessible by the main module, as described with reference to FIGS. 2a and 2b may do this. In this file the interrupt handler may note whether it is still awaiting a response from the database or whether the database has already signalled that it suspended its log. After one attempt to establish a global log point is completed, the list 312 is cleared (not shown).

Optionally, some error handling may be introduced for the case in which the database returns an error while trying to suspend the log. However, the time-out mechanism as explained above with reference to FIGS. 2a and 2b solve such situations without additional effort.

Then, it gets determined whether or not all databases have suspended their log (block 314). If no, the interrupt handler is terminated (block 316). If yes, a wake-up event is sent to the process performing the steps of the main module as described with reference to the FIGS. 2a and 2b (block 318). The wake-up event (block 320) will cause the procedure of the main module to be continued.

Figure 4:
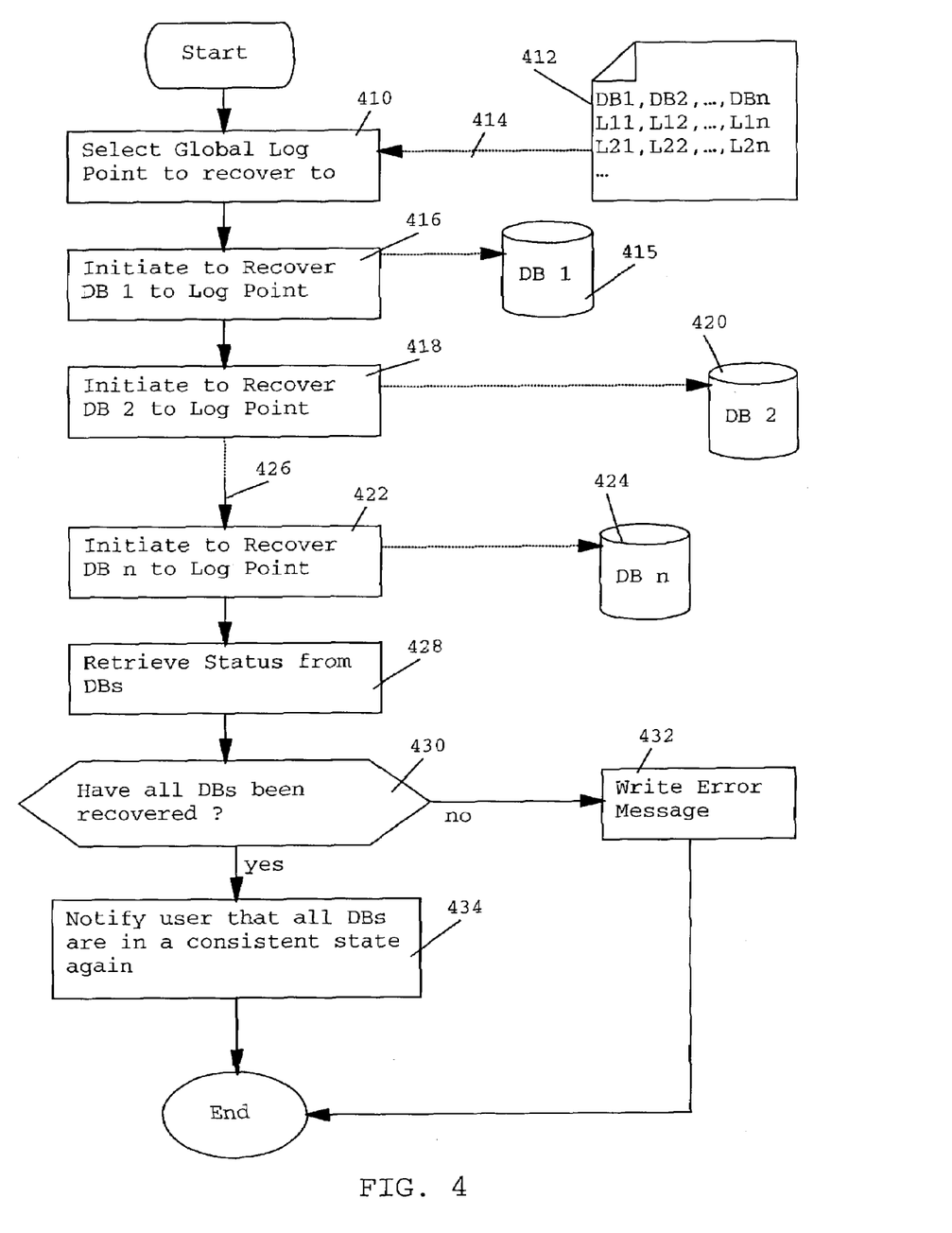
FIG. 4 shows a detailed flow chart of a method for recovering all databases to a synchronized recovery log point in the infrastructure of FIG. 1, according to the present invention.

With reference to FIG. 4, there is depicted a detailed flow chart of a method for recovering all databases to a synchronized recovery log point, i.e., a global log point, in the infrastructure of FIG. 1, according to the present invention. At the beginning, one global log point is selected to which the whole landscape should be recovered (block 410). In order to do so, the Coordinating Agent may advantageously retrieve a list 412 of all global log points, which have been established. The list of all databases may be stored in a file and may be read by the Coordinating Agent as illustrated by the dotted lined arrow 414 running from box 412 to block 410.

Subsequently, a command instructing a first database 415 to recover to a respective point in time specified in the list 412 (cf. to FIG. 5 for more details) is sent. The log file of a database contains the information that is needed to recover a consistent state of said database at the given prior point in time. Block 416 illustrates this step. This step could be done synchronously or asynchronously. For the sake of clarity, implementation details are omitted from the flow charts.

Correspondingly, block 418 illustrates sending the recover command to the second database 420 and block 422 illustrates sending the recover command to the n-th database 424. The partly dotted lined arrow 426 between block 418 and block 422 illustrates that the recover command may be sent to a plurality of databases. It is acknowledged that the steps of sending the recover command to the databases may also be implemented by using any kind of loops iterating through the list of the databases in the list 412.

Later, the status is retrieved from all databases (block 428) and it gets determined whether or not all databases have been recovered to the given prior point in time (block 430). The status also includes a list of all in-flight transactions, i.e., transactions for which the database cannot know if they should be rolled back or committed. The resolution of these in-flights is based on the understanding of specific transaction semantics. This particular situation can occur in the case a common two-phase commit protocol is used. The important point is that these transactions cannot go unnoticed which would be the case if an arbitrary set of log points (not created via means of the present invention) would be used for recovering the components.

If no, an error message is written in order to notify an administrator (block 432). If yes, the Coordinating Agent notifies the user that every single database has been recovered to the respectively specified prior point in time forming altogether the global log point and, hence, that a consistent state of the entire landscape could be established again (block 434).

Figure 5:
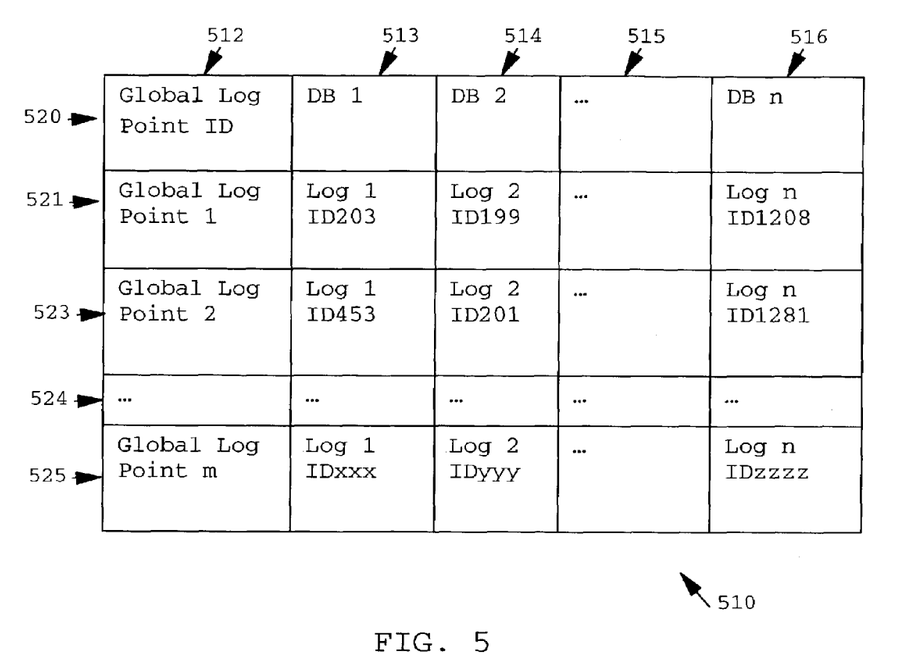
FIG. 5 shows a table for storing synchronized recovery log point used in the method and device according to the present invention.

With reference to FIG. 5, there is depicted a table for storing synchronized recovery log point used in the method and device according to the present invention. A global log point is formed by a set of database specific log points, which are identified by some kind of identification. Such identification may be different in different databases.

The table 510 of FIG. 5 has got five columns 512, 513, 514, 515, 516 and five rows 520, 521, 523, 524, 525. The first row 520 contains the titles of the columns. Hence, the first column 512 contains global log point identifications, i.e., some kind of identifier or key that allow to uniquely specifying one particular global log point. Advantageously, the time at which the respective global log point has been established is coded in the identification, here just "Global Log Point 1", "Global Log Point 2."

The second column 513 contains all individual log points from the first database DB 1. It should be noted that all individual log points are from Log 1, i.e., the log of the first database DB 1. Correspondingly, individual log points from the other databases are stored in the remaining columns. The fourth column 515 and the fourth row 524 illustrate that a plurality of databases and global log points may be stored in the table.

In other words, the individual log points from the databases, e.g., from the first database Log 1 ID203, from the second database Log 2 ID199 and from the n-th database Log n ID 1208 form altogether the first Global Log Point 1.

The individual log points are determined in accordance with the procedure as described with reference to FIGS. 2a and 2b.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. An infrastructure for establishing synchronized recovery log points, said infrastructure comprising: at least a first database management system and a second database management system, a network and a coordinating agent to communicates with the database management systems and containing information about the database management systems prior point in time recovery targets thereof for coordinating suspending log write of all database management systems, recording the corresponding log points for each database management system forming a global log point and a time out timer for signaling the coordinating agent to signal the database management systems to resume log writes of all database management systems only after a last database's log write gets suspended whereby no log write gets resumed before the last database's log write gets suspended, and recovery log files containing information needed to recreate a consistent state of the databases at a prior point in time.

2. A method for establishing synchronized recovery log points in an infrastructure comprising at least a first database management system, a second database management system, and a coordinating agent configured to communicate with all of the database management systems and containing information about the databases and prior point in time recovery targets, whereby recovery log files containing information needed to recreate a consistent set of prior point in time recovery targets, are written and log points are created separately for each database management system, characterized by the steps of: recovering a list of all databases for which recovery targets need to be established, sending a command to each data base suspending log write of all database management systems, recording the corresponding log points for each database management system forming a global log point, a time out timer signaling the coordinating agent to signal the data bases to resume log writes of all database management systems only after a last database's log write gets suspended whereby no log write gets resumed before the last database's log write gets suspended.

3. The method according to claim 2, wherein said infrastructure includes a plurality of separate computer systems communicationally connected by a network.

4. The method according to claim 2, further comprising steps of activating a timer that generates a wake up event and sends the wake up event to the coordinating agent to initiate performing a step of resuming log writes of all database management systems, when the timer signals wake up event.

5. The method according to claim 4, further comprising a step of waiting for a wake up event.

6. The method according to claim 5, further comprising a step of receiving a wake up event, if all database management systems have suspended their log write.

7. The method according to one of claim 2, further comprising a step of selecting a global log point.

8. The method according to claim 7, further comprising a step of initiating to recover each database management system to their corresponding log points forming the selected global log point.

9. A computer program product stored on a computer usable medium, comprising computer readable program means for causing a computer to perform a method according to claim 2.

* * * * *